(12) United States Patent
Oshikawa et al.

(10) Patent No.: US 8,227,133 B2
(45) Date of Patent: Jul. 24, 2012

(54) FUEL CELL SYSTEM

(75) Inventors: Katsuhiko Oshikawa, Susono (JP); Hideo Naohara, Sunto-gun (JP); Yoshifumi Hirao, Sunto-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 420 days.

(21) Appl. No.: 12/516,575

(22) PCT Filed: Apr. 1, 2008

(86) PCT No.: PCT/JP2008/056500
§ 371 (c)(1),
(2), (4) Date: May 28, 2009

(87) PCT Pub. No.: WO2008/132937
PCT Pub. Date: Nov. 6, 2008

(65) Prior Publication Data
US 2010/0092835 A1    Apr. 15, 2010

(30) Foreign Application Priority Data
Apr. 12, 2007  (JP) ................... 2007-104534

(51) Int. Cl.
*H01M 2/02*  (2006.01)
(52) U.S. Cl. .............. 429/474; 429/410; 429/458
(58) Field of Classification Search ............ 429/474, 429/410, 458
See application file for complete search history.

(56) References Cited

U.S. PATENT DOCUMENTS

| | | | |
|---|---|---|---|
| 5,470,670 A | 11/1995 | Yasumoto et al. | |
| 6,733,652 B1 * | 5/2004 | Putter et al. | 205/413 |
| 2003/0126796 A1 | 7/2003 | Hibino et al. | |
| 2004/0072050 A1 | 4/2004 | Miura et al. | |
| 2004/0072051 A1 | 4/2004 | Murata et al. | |
| 2005/0106428 A1 * | 5/2005 | Bolden | 429/19 |
| 2005/0142400 A1 * | 6/2005 | Turco et al. | 429/13 |

FOREIGN PATENT DOCUMENTS

| | | |
|---|---|---|
| JP | 61 260554 | 11/1986 |
| JP | 5 129032 | 5/1993 |
| JP | 6 260189 | 9/1994 |
| JP | 2003 155488 | 5/2003 |
| JP | 2003 201487 | 7/2003 |
| JP | 2004 111167 | 4/2004 |
| JP | 2004 134272 | 4/2004 |
| JP | 2004 134273 | 4/2004 |
| JP | 2005-147045 | 6/2005 |
| JP | 2005 203108 | 7/2005 |
| JP | 2005 228528 | 8/2005 |
| JP | 2006 54134 | 2/2006 |
| JP | 2006-137649 | 6/2006 |
| WO | 2006 067111 | 6/2006 |
| WO | 2006 067112 | 6/2006 |
| WO | 2006 067113 | 6/2006 |
| WO | 2006 067115 | 6/2006 |

* cited by examiner

OTHER PUBLICATIONS

Office Action issued Apr. 24, 2012, in Japanese Patent Application No. 2007-104534, filed Apr. 12, 2007.

*Primary Examiner* — Jane Rhee
(74) *Attorney, Agent, or Firm* — Oblon, Spivak, McClelland, Maier & Neustadt, L.L.P.

(57) ABSTRACT

A fuel cell system that can dispose of an odorant through the use of a simple configuration and assure enhanced hydrogen safety. A hydrogenation device is positioned between a fuel tank and a fuel cell. The hydrogenation device incorporates a hydrogenation catalyst for hydrogenating the odorant.

7 Claims, 3 Drawing Sheets

FUEL CELL SYSTEM

TECHNICAL FIELD

The present invention relates to a fuel cell system, and more particularly to a system having a fuel cell whose fuel is hydrogen gas to which an odorant is added.

BACKGROUND ART

The fuel gas used by a conventionally known fuel cell system disclosed, for instance, in JP-A-2004-134272 is hydrogen gas to which an odorant is added. The fuel tank included in the above conventional system stores a mixture of hydrogen and odorant so that the hydrogen can be safely handled. The smell of the odorant can be detected to judge whether a hydrogen line is hermetically sealed.

A catalytic layer is provided in a fuel cell to invoke a power generation reaction. When a gas mixture of hydrogen and odorant is supplied to the fuel cell, the catalytic layer may decrease its responsiveness due to poisoning by the odorant. Therefore, the above conventional system includes an adsorption mechanism, which is positioned between the fuel tank and fuel cell to adsorb the odorant. This ensures that the odorant is removed from the gas mixture of hydrogen and odorant to let the fuel cell generate electrical power in an unobstructed manner.

The adsorption capability of an adsorbent decreases with an increase in the amount of odorant adsorption. To address the above problem, the above conventional system restores the adsorbent's adsorption capability as needed by making use of reductive decomposition by hydrogen. Thus, the conventional technology described above makes it possible to establish a fuel cell system that provides enhanced hydrogen safety while continuously preventing the power generation of the fuel cell from being obstructed by catalyst poisoning.

Patent Document 1: JP-A-2004-134272
Patent Document 2: JP-A-2005-203108
Patent Document 3: JP-A-2004-111167

DISCLOSURE OF THE INVENTION

Problem to be Solved by the Invention

However, the adsorption mechanism for the above conventional system includes an adsorbent and a mechanism for restoring the adsorption capability of the adsorbent. The mechanism for restoring the adsorption capability includes a catalyst for inducing the decomposition of the odorant, a blower, and various other mechanisms. As just described, the conventional system described above includes many elements that constitute the adsorption mechanism. Consequently, the system may become complex and large.

The present invention has been made to solve the above problem. An object of the present invention is to provide a fuel cell system that can dispose of an odorant through the use of a simple configuration and assure enhanced hydrogen safety.

Means for Solving the Problem

To achieve the above-mentioned purpose, the first aspect of the present invention is a fuel cell system comprising:

a fuel cell which includes a membrane electrode assembly that is formed by disposing a catalytic layer on both surfaces of an electrolyte membrane;

a gas flow path connected to the catalytic layer;

a fuel tank which is connected to the gas flow path to supply a fuel gas to the catalytic layer through the gas flow path; and a hydrogenation catalyst which is disposed in a gas distribution path that is extended from the fuel tank to the catalytic layer through the gas flow path, and used to hydrogenate a nonsulfur odorant.

The second aspect of the present invention is the fuel cell system according to the first aspect, further comprising:

heat supply means for supplying heat generated by the fuel cell to the hydrogenation catalyst.

The third aspect of the present invention is the fuel cell system according to the first aspect or the second aspect, wherein the fuel cell is a fuel cell stack, which is formed by stacking a plurality of the membrane electrode assembly with a separator sandwiched in between; and wherein the gas flow path includes a manifold, which is extended within the fuel cell stack and connected to the catalytic layers of the plurality of the membrane electrode assembly, and a conduit, which is disposed outside the fuel cell stack and connects the manifold to the fuel tank; the fuel cell system comprising:

a hydrogenation cell which contains the hydrogenation catalyst, is integrated into the fuel cell stack, and is positioned between the manifold and the conduit.

The fourth aspect of the present invention is the fuel cell system according to any one of the first to the third aspects, wherein the fuel cell is a fuel cell stack, which is formed by stacking a plurality of the membrane electrode assembly with a separator sandwiched in between; wherein the gas flow path includes a manifold, which is extended within the fuel cell stack and connected to the catalytic layers of the plurality of the membrane electrode assembly; and wherein the hydrogenation catalyst is disposed in the manifold.

The fifth aspect of the present invention is the fuel cell system according to any one of the first to the fourth aspects, further comprising:

a gas distribution member, which includes a gas diffusion layer and a plate material that is stacked on the gas diffusion layer and provided with a groove in the surface in contact with the gas diffusion layer, and is superimposed over the catalytic layer so that the gas diffusion layer faces the catalytic layer;

wherein the groove is connected to the gas flow path and positioned between the gas flow path and the catalytic layer; and wherein the hydrogenation catalyst is disposed on the inner surface of the groove.

To achieve the above-mentioned purpose, the sixth aspect of the present invention is a fuel cell comprising:

a membrane electrode assembly in which a catalytic layer containing a catalyst and a support is disposed on both surfaces of an electrolyte membrane; and a gas distribution member which is superimposed over the catalytic layer and includes a gas inlet and a gas flow path that is internally extended from the gas inlet and connected to the catalytic layer;

wherein a first portion of the catalytic layer, which is positioned near the gas inlet, differs in catalyst material from a second portion, which is the remaining portion of the catalytic layer; and wherein the catalyst material for the first portion is less active in generating protons from hydrogen atoms than the catalyst material for the second portion and equally or more active in hydrogenating a nonsulfur odorant than the catalyst material for the second portion.

The seventh aspect of the present invention is the fuel cell according to the sixth aspect, wherein the catalyst for the first portion of the catalytic layer contains either a nickel-molybdenum (NiMo) catalyst or a cobalt-molybdenum (CoMo) catalyst.

ADVANTAGES OF THE INVENTION

According to the first aspect of the present invention, the fuel tank stores a gas mixture of hydrogen and nonsulfur odorant so that the odorant in the gas mixture can be hydrogenated and supplied to the fuel cell when it generates electrical power. According to the method of hydrogenating the odorant and supplying the hydrogenated odorant to the fuel cell, the poisoning effect of the odorant on a fuel cell anode catalyst can be reduced through the use of a simple configuration. This makes it possible to establish a fuel cell system that provides enhanced hydrogen safety through the use of a simple configuration.

According to the second aspect of the present invention, the heat generated during a reaction within the fuel cell can be used as the reaction heat for a hydrogenation catalyst.

According to the third aspect of the present invention, a hydrogenation cell incorporating a hydrogenation catalyst can be combined with a fuel cell stack to reduce the space requirements. Therefore, a fuel cell system that provides enhanced hydrogen safety through the use of a simple configuration can be established without requiring a dedicated standalone hydrogenation device.

According to the fourth aspect of the present invention, the odorant contained in a gas that flows to each electrolyte membrane in the fuel cell stack can be effectively hydrogenated.

According to the fifth aspect of the present invention, a groove that serves as the gas flow path of a gas distribution member is coated with a hydrogenation catalyst. It means that the hydrogenation catalyst is directly provided within the fuel cell. Consequently, the use of a simple system makes it possible to hydrogenate the odorant without requiring a dedicated standalone hydrogenation device.

According to the sixth aspect of the present invention, the fuel cell system that uses a mixture of hydrogen and nonsulfur odorant as fuel is configured so that the first portion close to the gas inlet, into which the odorant flows, is used for odorant hydrogenation. Therefore, the catalytic layer of the second portion, which should contribute to power generation reaction, can be protected from poisoning. This ensures that the fuel cell generates electrical power in an unobstructed manner. Further, as the odorant can be hydrogenated within the fuel cell, a fuel cell system incorporating an odorant hydrogenation function can be established through the use of a simple configuration.

According to the seventh aspect of the present invention, the odorant hydrogenation function of the first portion's catalyst can be implemented by using a material that is less expensive than noble metal.

Figure 1:
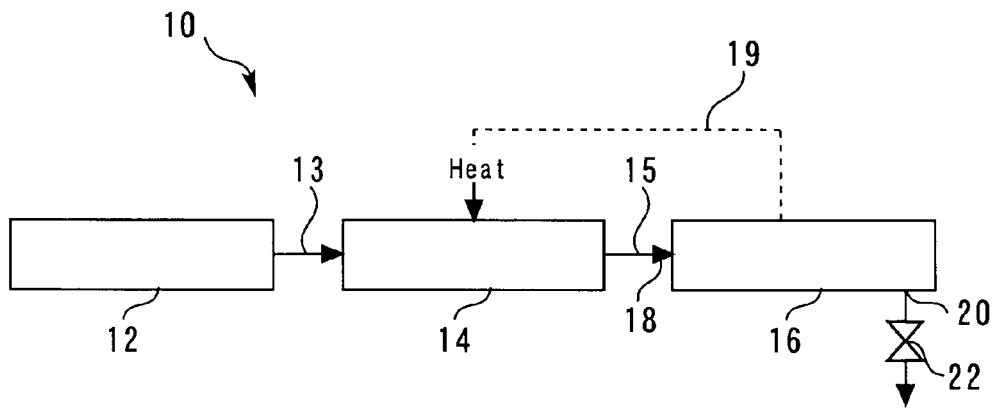
FIG. 1 is a diagram illustrating a fuel cell system according to a first embodiment of the present invention.

DESCRIPTION OF NOTATIONS 10 fuel cell system
12 fuel tank
14 hydrogenation device
16 fuel cell
18 anode gas inlet
20 anode gas outlet
22 purge valve
24 support
26 catalyst active site
28 hydrogenation catalyst
112 fuel tank
116 fuel cell stack
130 hydrogenation cell
132,232,332,432,532 unit fuel cell
134 anode-side gas flow path
140 manifold
240 electrolyte membrane
242,442 electrode catalytic layer
244 gas diffusion layer
246 separator
248,448 gas flow path
250,350,450 hydrogenation catalytic layer

BEST MODE FOR CARRYING OUT THE INVENTION

First Embodiment

Configuration of First Embodiment

FIG. 1 is a diagram illustrating a fuel cell system according to a first embodiment of the present invention. A fuel cell system 10 shown in FIG. 1 includes a fuel tank 12. The fuel tank 12 stores a gas mixture of hydrogen and nonsulfur odorant. A method of detecting hydrogen leakage through the use of an odorant is advantageous in that, for example, a dedicated hydrogen leakage sensor need not be used. The first embodiment assumes that ethyl acrylate is used as the odorant.

The downstream end of the fuel tank 12 is connected to a conduit 13. The conduit 13 is provided with various fuel supply mechanisms (not shown) such as a shutoff valve and a regulator. The conduit 13 is connected to a hydrogenation device 14. The hydrogenation device 14 hydrogenates the odorant in the fuel tank 12 as described later with reference to FIG. 2. The downstream end of the hydrogenation device 14 is connected to an anode gas inlet 18 of a fuel cell 16 through a conduit 15.

The fuel cell 16 is a fuel cell stack that is obtained by stacking a plurality of unit fuel cells. Each unit fuel cell, which is not shown, is configured so that a membrane electrode assembly is sandwiched between a pair of power collector plates. The membrane electrode assembly is obtained by integrating a catalyst with both surfaces of a solid polymer electrolyte membrane. Further, a gas diffusion layer made, for instance, of a carbon sheet is integrated with each surface of the membrane electrode assembly. The power collector plates double as a separator between two adjacent membrane electrode assemblies.

The unit fuel cell is such that one surface of the membrane electrode assembly functions as an anode while the other surface functions as a cathode. When the unit fuel cell generates electrical power, the anode receives supplied hydrogen whereas the cathode receives supplied air. Power generation takes place during an electrochemical reaction that is invoked through the membrane electrode assembly.

The plurality of unit fuel cells each include an anode-side gas flow path. The first embodiment cuts a groove (not shown) in the surface of the power collector plate (separator) and uses the groove as the anode-side gas flow path. Hydrogen is distributed along the groove and delivered to an electrode catalytic layer of the anode through the gas diffusion layer.

Within the fuel cell 16, the unit fuel cells are stacked so that their anode-side gas flow paths converge to form an anode-side manifold (not shown). The anode gas inlet 18 communicates with the anode-side manifold. The configuration of a fuel cell that includes a membrane electrode assembly, a gas diffusion layer, a separator, and a manifold, as is the case with the fuel cell 16, is publicly known and will not be described in detail.

The fuel cell 16 has an anode gas outlet 20, which communicates with the downstream end of the aforementioned anode-side manifold. The downstream end of the anode gas outlet 20 is connected to a purge valve 22. The downstream end of the purge valve 22 is connected to an exhaust system (not shown).

The present embodiment supplies a fuel gas to the fuel cell 16, and generates electrical power while storing the fuel gas in the anode-side gas flow path. Further, the present embodiment opens the purge valve 22 as needed to purge the interior of the anode-side gas flow path. This type of system may be called an anode-dead-end system.

Figure 2A:
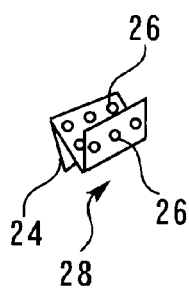
FIGS. 2A and 2B are diagrams illustrating a hydrogenation device according to the first embodiment.
Figure 2B:
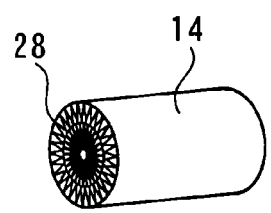

FIGS. 2A and 2B illustrate the configuration of the hydrogenation device 14. A hydrogenation catalyst 28, which is shown in FIG. 2A, is positioned inside the hydrogenation device 14. The hydrogenation catalyst 28 is structured so that a support 24, which supports catalyst active sites 26, is formed into folds. FIG. 2A is an enlarged view of a part of the hydrogenation catalyst 28. FIG. 2B shows the external shape of the hydrogenation device 14. As shown in FIG. 2B, the hydrogenation device 14 is cylindrical in external shape and incorporates the hydrogenation catalyst 28.

The present embodiment uses a ceramic support as the support 24, and forms the hydrogenation catalyst by coating the support with platinum, which serves as a catalyst active site 26. The materials and method, for example, for constituting the hydrogenation device 14 may be based, for instance, on those disclosed in JP-A-2004-134272.

Further, as shown in FIG. 1, the fuel cell system 10 is configured so that the heat generated by the fuel cell 16 is supplied to the hydrogenation device 14. More specifically, the first embodiment includes a cooling fluid flow path 19, which runs inside the fuel cell 16 and reaches the hydrogenation device 14. A cooling fluid, which flows in the cooling-fluid flow path 19, draws off heat from the fuel cell 16 and supplies the heat to the hydrogenation device 14. In this manner, the heat of the fuel cell 16 is transmitted to the hydrogenation catalyst 28. An alternative is to use a thermally-conductive material as the peripheries of both the hydrogenation device 14 and fuel cell 16 and position these two devices adjacent to each other so that they contact each other to permit heat exchange between them.

Operation and Action of First Embodiment

The operation and action of the fuel cell system 10 according to the first embodiment will now be described. As described earlier, the fuel tank 12 stores a gas mixture of hydrogen and nonsulfur odorant in the interest, for instance, of safety. When the fuel cell system 10 generates electrical power, the fuel tank 12 supplies the gas mixture of hydrogen and odorant downstream.

When the odorant is directly supplied to the fuel cell, the catalyst in the fuel cell may be poisoned by the odorant to obstruct the power generation by the fuel cell. Although a certain disclosed system has an adsorption mechanism for performing an adsorption process on the odorant to avoid the above problem, the adsorption mechanism is composed of many elements. Consequently, the system may become complex and large. It is therefore preferred that conflicting demands, namely, the demand for providing enhanced hydrogen safety through the use of the odorant and the demand for maintaining an excellent power generation by the fuel cell, be simultaneously met while preventing the system from becoming complex and large.

Figure 3A:
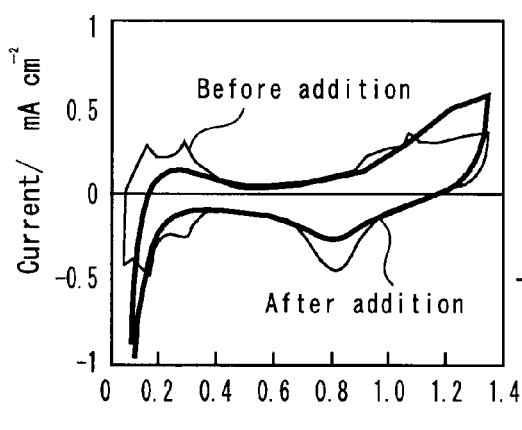
FIGS. 3A and 3B illustrate the experiment results for describing the basic idea and effects according to the first embodiment.
Figure 3B:
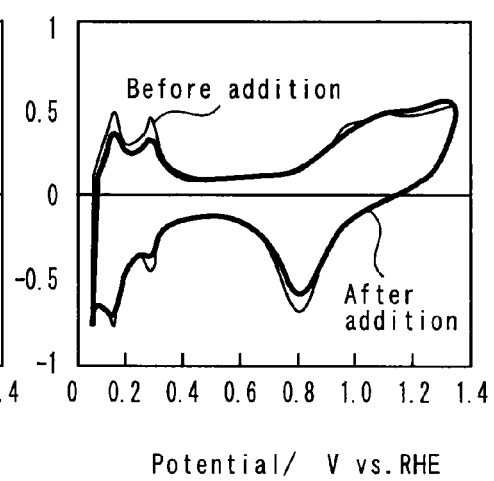

As such being the case, the present embodiment uses the following method to meet the above demands. FIGS. 3A and 3B illustrate an odorant processing method according to the present embodiment, or more specifically, illustrate the hydrogenation effect of the odorant. Hydrogenation is a reduction reaction during which hydrogen is used as a reductant to add hydrogen atoms to a chemical compound (also referred to as hydrogen addition or hydrogen reduction).

To be more precise, FIGS. 3A and 3B show the results of experimental measurements that were made by a CV (Cyclic Voltammetry) method while using a platinum electrode. The figures show measurements that were taken before and after ethyl acrylate was added to a solution in which the platinum electrode was immersed. The left side (close to 0.2 along the horizontal axis) of FIG. 3A indicates that the electrical current density (vertical axis) prevailing after addition (thick line) is lower than the electrical current density prevailing before addition (thin line). It can therefore be concluded that the platinum electrode was poisoned due to the addition of ethyl acrylate.

FIG. 3B shows the results of experimental measurements that were made in the same manner as described with reference to FIG. 3A except that ethyl acrylate was substituted by ethyl propionate, which is hydrogenated ethyl acrylate. A comparison between the thin line indicating the electrical current density prevailing before addition and the thick line indicating the electrical current density prevailing after addition reveals that the electrical current density was not substantially decreased by the addition of ethyl propionate in a region close to 0.2 along the horizontal axis. As is obvious from the results shown in FIGS. 3A and 3B, ethyl propionate is less poisonous to platinum than ethyl acrylate.

A double-bonded, unsaturated hydrocarbon compound such as ethyl acrylate contains $\pi$ electrons. The $\pi$ electrons are readily adsorbed to the surface of a catalyst. This characteristic of $\pi$ electrons causes the odorant to poison the catalyst. However, this adsorption characteristic decreases when the odorant is hydrogenated. More specifically, ethyl propionate, which is hydrogenated ethyl acrylate, is less poisonous than ethyl acrylate as indicated in FIGS. 3A and 3B. In other words, a hydrogenation reaction can be used to decrease the odorant's adsorbability to the catalyst.

Figure 4:
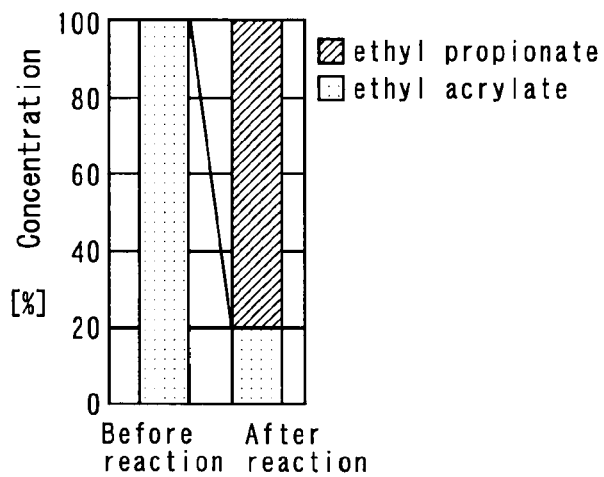
FIG. 4 illustrates the experiment results for describing the basic idea and effects according to the first embodiment.

FIG. 4 shows the addition ratio for an ethyl acrylate hydrogenation reaction that occurs when a platinum catalyst is used under fuel cell reaction conditions. More specifically, FIG. 4 shows how the concentration of ethyl acrylate changes due to hydrogenation reaction caused by a platinum catalyst at a temperature of 80° C. As shown in FIG. 4, 100% ethyl acrylate changed to a mixture of 20% ethyl acrylate and 80% ethyl propionate due to hydrogenation reaction. As described above, ethyl acrylate can be hydrogenated to obtain ethyl propionate when the catalyst is used in a temperature atmosphere corresponding to the fuel cell reaction conditions.

In view of the above circumstances, the inventor of the present invention has worked out an effective method of providing enhanced hydrogen safety through the use of the odorant while hydrogenating the odorant in fuel gas to prevent the fuel cell from poisoning the catalyst. More specifically, the first embodiment positions the hydrogenation device 14 downstream of the fuel tank 12 and upstream of the fuel cell 16. The hydrogenation device 14 incorporates the hydrogenation catalyst 28 as described earlier.

The use of the above configuration ensures that the odorant contained in the gas mixture is hydrogenated due to a reaction at the catalyst active site 26 when it passes through the hydrogenation device 14. The hydrogenated odorant then flows downstream of the hydrogenation device 14 so that the odorant is supplied to the fuel cell 16 together with hydrogen. As mentioned earlier, the poisonous property of the hydrogenated odorant is decreased. This makes it possible to prevent the catalytic layer of the fuel cell 16 from being poisoned and let the fuel cell generate electrical power in an unobstructed manner.

Further, the present embodiment invokes a catalytic reaction to facilitate hydrogenation so that the hydrogenated odorant flows downstream of the hydrogenation device 14. In marked contrast to the use of an adsorption mechanism, therefore, the present embodiment does not capture or store the odorant for odorant processing purposes. The use of this method makes it possible to prevent the overall configuration of the fuel cell system from becoming complex without having to periodically replace the hydrogenation device 14 or installing a special mechanism (e.g., odorant exhaust piping) for processing a stored odorant.

When the concentration of the hydrogenated odorant increases within the fuel cell 16, the present embodiment opens the purge valve 22 at appropriate timing. This ensures that the hydrogenated odorant is purged together with the other impurities such as nitrogen. Further, in the fuel cell system 10, the odorant contained in an off-gas, which flows downstream of the fuel cell 16, is already hydrogenated. When the odorant is hydrogenated, the quality of its odor changes so that it smells sweet. It means that the dangerous smell is eliminated from the odorant. Consequently, the system according to the present embodiment is advantageous in that no deodorization mechanism needs to be installed downstream of the fuel cell 16.

Furthermore, the present embodiment is configured so that the heat generated from the hydrogenation device 14 and fuel cell 16 can be supplied to the hydrogenation device 14. A double-bonded hydrogenation reaction in a hydrocarbon compound requires heat. Therefore, the present embodiment ensures that the heat generated during power generation reaction in the fuel cell 16 can be used for hydrogenation purposes. The above-mentioned hydrogenation reaction progresses as far as the temperature is approximately 50° C. The temperature of the fuel cell 16 can be approximately between 80° C. and 100° C. during power generation reaction. Therefore, when the heat generated during power generation reaction is supplied to the hydrogenation catalyst, the heat for hydrogenation reaction can be sufficiently supplied. This advantage is also obvious from the hydrogenation effect that is produced when a platinum catalyst is used under fuel cell power generation conditions as described with reference to FIG. 4. This makes it possible to permit the use of a simple, compact, dedicated heating device, thereby further simplifying the system configuration.

When the hydrogenation catalyst is incorporated as described in conjunction with the present embodiment, CO, $H_2S$, and other impurities existing in fuel gas can be adsorbed. When molecules having a carboxylic group or ester group are progressively hydrocracked, CO is generated as a poisonous side product. It is thermodynamically difficult to avoid this side reaction. A common adsorbent (e.g., activated carbon) does not adsorb CO and allows CO to flow into the fuel cell. The present embodiment can decrease the poisonous property of the odorant as described earlier and inhibit the above-mentioned side products from flowing into the fuel cell 16, thereby preventing a decrease in the durability of the fuel cell 16.

Moreover, when the support 24 is formed into folds as described in conjunction with the present embodiment, the pressure loss can be reduced when a fuel gas is supplied to the fuel cell 16 through the hydrogenation device 14. The present embodiment is configured so that the hydrogenation device 14 is positioned upstream of and proximal to the fuel cell 16. There is a viewpoint that the function of the odorant should be fully utilized outside the fuel cell 16 in order to detect hydrogen leakage with increased certainty. From this viewpoint, an enhanced effect can be produced by setting an odorant hydrogenation position (the position of the hydrogenation device 14) close to the fuel cell 16 or by placing no other control device (other piping, valve, etc.) between the fuel cell 16 and hydrogenation device 14 as described in conjunction with the present embodiment.

In the first embodiment, which has been described above, the fuel cell 16 corresponds to the "fuel cell" according to the first aspect of the present invention; the fuel tank 12 corresponds to the "fuel tank" according to the first aspect of the present invention; and the conduits 13, 15, the manifold and separator groove in the fuel cell 16, and other gas channels connecting the fuel tank 12 to the electrode catalytic layer in the fuel cell 16 correspond to the "gas flow path" according to the first aspect of the present invention. Further, the hydrogenation catalyst 28 in the hydrogenation device 14 corresponds to the "hydrogenation catalyst" according to the first aspect of the present invention.

Furthermore, in the first embodiment, which has been described above, heat exchange by the cooling fluid flowing in the cooling fluid flow path 19 corresponds to an act that is accomplished by the "heat supply means" according to the second aspect of the present invention.

Modifications of First Embodiment

First Modification

In the first embodiment, ethyl acrylate is used as the non-sulfur odorant to be added to hydrogen. However, the present invention is not limited to this. As described earlier, the odorant poisons the catalyst because the π electrons in the odorant are readily adsorbed to the catalyst surface. The odorant's adsorbability to the catalyst can be decreased by hydrogenating the odorant. In this respect, the odorant applicable to the present invention is not limited to ethyl acrylate.

For example, an odorant containing various unsaturated hydrocarbon compounds, such as the odorant disclosed in JP-A-2004-134272, can be used with the present invention. A nonsulfur odorant is characterized in that it is less adsorptive than a sulfur odorant. In the system according to the present invention or other similar system in which a hydrogenated odorant flows into a fuel cell, therefore, it is preferred that a nonsulfur odorant be used.

Second Modification

The system assumed by a second modification is an anode-dead-end type fuel cell system, which supplies a fuel gas to the fuel cell 16 and generates electrical power while storing the fuel gas inside. However, the present invention is not limited to such a fuel cell system. The present invention can also be applied to a system that has a circulation line including a gas flow path for the anode side of the fuel cell, and circulates hydrogen in the circulation line.

Third Modification

The first embodiment is configured so that the hydrogenation device 14 incorporates the support 24, which supports the catalyst active sites 26 and is formed into folds. However, the present invention is not limited to this. For example, a honeycombed base material may be used to support the catalyst active sites. The honeycombed base material may be made of various materials such as metal, ceramic, or other nonconductive materials.

Fourth Modification

In the first embodiment, the heat generated during a power generation process of the fuel cell 16 is supplied to the hydrogenation device 14. However, the present invention is not limited to this. A heater or other similar heating mechanism may alternatively be used. When, for instance, the fuel cell system 10 is mounted in a vehicle, another alternative is to make use of friction heat generated from a brake, regenerated braking energy, or heat generated during vehicle driving. This alternative method is advantageous in that it can simplify or omit the heating mechanism, as is the case with the first embodiment, and reduce the size of a radiator.

Fifth Modification

The present embodiment uses a ceramic support as the support 24, and forms the hydrogenation catalyst by coating the support with platinum, which serves as the catalyst active sites 26. Alternatively, however, a material other than noble metal may be used as the catalyst active sites in consideration of low cost and other benefits.

The catalyst active sites 26 may be made, for instance, of a nickel-molybdenum (NiMo) catalyst, cobalt-molybdenum (CoMo) catalyst, platinum-alloy catalyst, metal-oxide catalyst ($WO_3$, $MoO_3$, or $V_2O_5$), Pd catalyst, or Au nanocluster catalyst. The support 24 may be made, for instance, of alumina, titania, silica, or various other metallic materials. Further, for instance, platinum, platinum alloy, metal oxide, or its carbide, nitride, or sulfide can be used. In addition, palladium, palladium alloy, or gold nanoparticles can be used. These materials can be supported, for instance, by an alumina or titania support.

The shape and configuration of the gas flow paths in the unit fuel cells are not specifically limited. An alternative is to form a porous layer that is made of a conductive material and positioned between the power collector plate and membrane electrode assembly, and use contiguous pores in the porous layer to form the gas flow paths.

Second Embodiment

Figure 5:
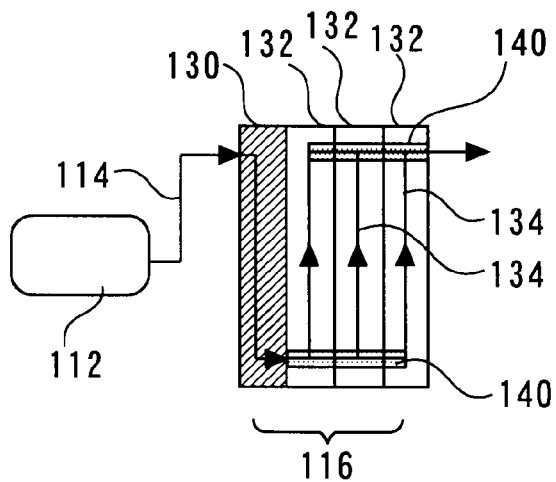
FIG. 5 is a diagram illustrating the configuration of the fuel cell system according to the second embodiment.

FIG. 5 is a diagram illustrating the configuration of the fuel cell system according to a second embodiment of the present invention. As is the case with the system according to the first embodiment, the system according to the second embodiment includes a fuel tank 112 that stores a mixture of hydrogen and odorant. The fuel tank 112 is connected to a fuel cell stack 116 through a conduit 114. The fuel cell stack 116 includes a plurality of unit fuel cells 132 and a hydrogenation cell 130. The system according to the second embodiment is characterized in that the hydrogenation cell 130 hydrogenates the odorant.

The fuel cell stack 116 is obtained by stacking the plurality of unit fuel cells 132. The unit fuel cells 132 include a membrane electrode assembly, a gas diffusion layer, and a separator, as is the case with the unit fuel cells contained in the fuel cell 16 according to the first embodiment. Therefore, the structures of such constituent elements are not shown in FIG. 5.

The unit fuel cells 132 each include an anode-side gas flow path 134. The anode-side gas flow path 134 is a groove that is formed in the separator of a unit fuel cell 132. The fuel cell stack 116 includes a manifold 140 that converges the anode-side gas flow paths 134 of the unit fuel cells 132. The manifold 140 penetrates through the unit fuel cells 132 and extends in their stacking direction.

The hydrogenation cell 130 is disposed at one end of the fuel cell stack 116. The hydrogenation cell 130 contains a hydrogenation cell. The interior of the hydrogenation cell 130 can be configured so as to include only the anode-side gas flow path and catalytic layer of a unit fuel cell 132. The catalyst active site and support of the catalytic layer may be made of various materials, as is the case with the first embodiment.

When the system according to the second embodiment generates electrical power, a gas mixture of hydrogen and odorant, which is supplied from the fuel tank 112 shown in FIG. 5, flows into the hydrogenation cell 130. The odorant becomes hydrogenated when it passes through the hydrogenation cell 130. As a result, the hydrogen and the hydrogenated odorant flow into the manifold 140 and are supplied to the anodes of the unit fuel cells 132.

In the second embodiment, the hydrogenation cell 130 is mounted in the fuel cell stack 116. In this respect, a system configuration can be compact and the space requirements can be reduced as compared to the first embodiment in which a separate hydrogenation device is used. In addition, the fuel cell stack can efficiently exchange heat with the hydrogenation catalyst because the hydrogenation cell is mounted in the fuel cell stack.

The second embodiment, which has been described above, is configured so that the hydrogenation cell 130 includes only the anode-side gas flow path and catalytic layer of a unit fuel cell 132. If the configuration of the hydrogenation cell 130 is similar (common) to that of the unit fuel cell 132, common members can be used to provide manufacturing advantages and advantages, for instance, of compactness of the entire fuel cell stack. However, the present invention is not limited to this. The hydrogenation catalyst can be positioned inside the hydrogenation cell 130 as far as the hydrogenation catalyst hydrogenates the odorant during a process in which a gas is distributed within the hydrogenation cell 130. For example, the shapes, positions, materials, and other design elements of the gas flow paths and catalytic layer can be changed as needed.

From the viewpoint of detecting hydrogen leakage with increased certainty, a considerable effect can be produced by setting the odorant hydrogenation position close to a'portion where hydrogen reaction occurs, that is, the electrode catalytic layer in the fuel cell. In this respect, the second embodiment, in which the hydrogenation cell 130 is integrated into the fuel cell stack 116, can prevent the catalyst in the fuel cell from being poisoned while providing enhanced hydrogen safety through the use of the odorant.

In the second embodiment, which has been described above, the fuel cell stack 116 corresponds to the "fuel cell stack" according to the third aspect of the present invention; the manifold 140 corresponds to the "manifold" according to the third aspect of the present invention; and the hydrogenation cell 130 corresponds to the "hydrogenation cell" according to the third aspect of the present invention.

As an alternative to disposing the hydrogenation cell 130 according to the second embodiment, a hydrogenation catalyst may be disposed at an inlet of the manifold 140. The above configuration makes it possible to hydrogenate the odorant within the fuel cell and prevent the catalyst in the fuel cell from being poisoned while providing maximum hydrogen safety through the use of the odorant. The above configuration is achieved, for instance, when the same configuration as that of the hydrogenation catalyst 28 according to the first embodiment is positioned within the manifold 140.

In the above case, the fuel cell stack 116 corresponds to the "fuel cell stack" according to the fourth aspect of the present invention; the manifold 140 corresponds to the "manifold" according to the fourth aspect of the present invention; and the hydrogenation catalyst disposed in the manifold 140 corresponds to the structure in which the "the hydrogenation catalyst is disposed in the manifold."

Third Embodiment

Figure 6:
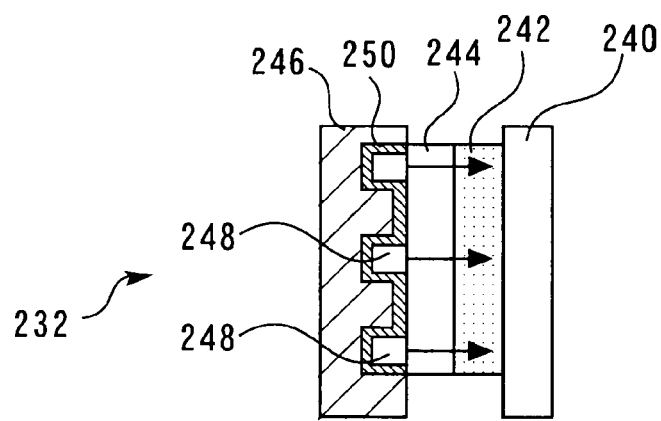
FIG. 6 is a diagram illustrating the configuration of the fuel cell system according to the third embodiment.

FIG. 6 is a diagram illustrating the configuration of the fuel cell system according to a third embodiment of the present invention. This diagram depicts the internal configuration of a unit fuel cell according to the third embodiment. As is the case with the system according to the first embodiment, the system according to the third embodiment includes, for instance, a fuel tank that contains hydrogen and nonsulfur odorant, a fuel cell that is obtained by stacking a plurality of unit fuel cells, and a purge valve.

The third embodiment is characterized in that the odorant is hydrogenated not by the hydrogenation device according to the first embodiment, but by a later-described hydrogenation catalyst that is disposed in the fuel cell. The following description deals with only the internal configuration of the fuel cell, which is characteristic of the third embodiment, and omits the same features as those of the first embodiment.

FIG. 6 shows the anode configuration of a unit fuel cell 232 of the fuel cell system according to the third embodiment. The unit fuel cell 232 includes an electrolyte membrane 240. Stacked on one surface of the electrolyte membrane 240 are an electrode catalytic layer 242, a gas diffusion layer 244, and a separator 246. The separator 246 is provided with a gas flow path 248.

As is the case with the first and second embodiments, the gas flow path 248 is provided as a groove in the separator 246.

Referring to FIG. 6, hydrogen is distributed in the direction of paper penetration along the gas flow path 248 and delivered to the electrode catalytic layer 24 through the gas diffusion layer 244 (see the arrows in FIG. 6). As described in conjunction with the first and second embodiments, one end of the gas flow path 248 is connected to the fuel tank through the manifold, conduit, regulator, shutoff valve, and the like.

The gas flow path 248 in the separator 246 is coated with a hydrogenation catalytic layer 250. The hydrogenation catalytic layer 250 can be formed by allowing a conductive support (e.g., carbon) to support platinum, turning the resulting combination into paste, and coating the surface of the separator 246 with the paste.

According to the third embodiment, a gas mixture of hydrogen and odorant, which is supplied from the fuel tank, comes into contact with the hydrogenation catalytic layer 250 when it flows in the gas flow path 248. The hydrogenation catalytic layer 250 hydrogenates the odorant to decrease the poisonous property. This makes it possible to prevent the electrode catalytic layer 242 from being poisoned and permit the fuel cell to generate electrical power in an unobstructed manner.

As a modification of the third embodiment, only the inner surface of the gas flow path 248 can be coated with the hydrogenation catalytic layer 250. This creates a configuration in which the contact between the separator 246 and gas diffusion layer 244 cannot be provided with the hydrogenation catalytic layer 250. In this configuration, the hydrogenation catalytic layer 250 need not be electrically conductive because direct electrical conduction can be provided by the separator 246 and gas diffusion layer 244.

Consequently, a material for the support can be selected from a wide variety of options including metal oxides and ceramics, such as titania, alumina, and silica, without having to use, for instance, a carbon support as described in conjunction with the third embodiment. Thus, the hydrogenation catalyst can be formed by selecting the materials for the catalyst active site and substance as needed from various options including low-conductivity materials and nonconductive materials in consideration, for instance, of low cost, high strength, and high durability.

As described earlier, from the viewpoint of detecting hydrogen leakage with increased certainty, a considerable effect can be produced by setting the odorant hydrogenation position close to a portion where hydrogen reaction occurs, that is, the electrode catalytic layer in the fuel cell. In this respect, the third embodiment, in which the odorant is hydrogenated inside the fuel cell, can prevent the catalyst in the fuel cell from being poisoned while providing hydrogen safety through the use of the odorant.

In the third embodiment, the gas diffusion layer 244 corresponds to the "gas diffusion layer" according to the fifth aspect of the present invention; the separator 246 corresponds to the "plate material" according to the fifth aspect of the present invention; and the gas flow path 248 corresponds to the "groove" according to the fifth aspect of the present invention. Further, in the third embodiment, the structure in which "the inner surface of the groove is coated with a layer of the hydrogenation catalyst" is implemented by the hydrogenation catalytic layer 250.

Fourth Embodiment

Figure 7:
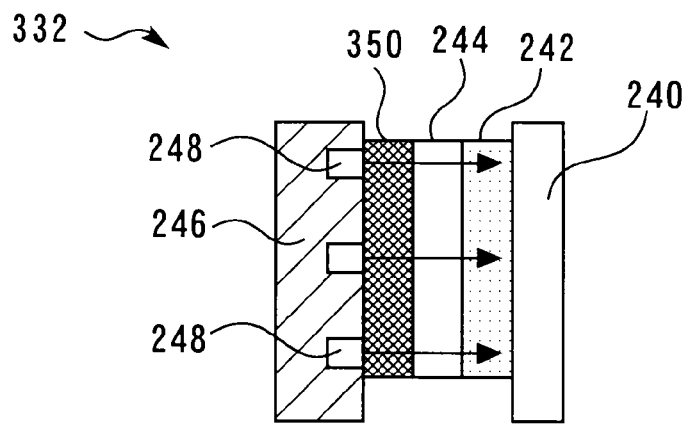
FIG. 7 is a diagram illustrating the configuration of a unit fuel cell of the fuel cell system according to the fourth embodiment.

FIG. 7 is a diagram illustrating the configuration of a unit fuel cell 332 of the fuel cell system according to a fourth embodiment of the present invention. As is the case with the system according to the third embodiment, the system according to the fourth embodiment includes, for instance, a fuel tank that contains hydrogen and nonsulfur odorant, a fuel cell that is obtained by stacking a plurality of unit fuel cells, and a purge valve. The following description deals with only the anode-side configuration of a unit fuel cell 332, which is characteristic of the fourth embodiment, and omits the same features as those of the third embodiment.

The configuration shown in FIG. 7 corresponds to a portion of the configuration of a unit fuel cell 232 according to the third embodiment that is shown in FIG. 6. The unit fuel cell 332 shown in FIG. 7 does not include the hydrogenation catalytic layer 250, but includes a hydrogenation catalytic layer 350 that is inserted between the separator 246 and gas diffusion layer 244. In this respect, the fourth embodiment differs from the third embodiment. The hydrogenation catalytic layer 350 can be formed by allowing a conductive support (e.g., carbon) to support platinum, turning the resulting combination into paste, and coating the surface of the gas diffusion layer 244 with the paste.

When the above configuration is employed, the hydrogen is delivered to the electrode catalytic layer 242 through the hydrogenation catalytic layer 350 and gas diffusion layer 244, whereas the odorant is hydrogenated by the hydrogenation catalytic layer 350 before being delivered to the electrode catalytic layer 242. This ensures that an unhydrogenated odorant, which poisons the catalyst, does not reach the electrode catalytic layer 242.

When the hydrogenation catalytic layer is formed on the gas diffusion layer, the resulting surface is smoother than the surface of an exposed gas diffusion layer. This provides an advantage in that the contact resistance to the separator decreases to reduce electrical resistance. The hydrogenation catalytic layer may be positioned in the gas diffusion layer. More specifically, when the gas diffusion layer is to be formed by using carbon sheets, it is also possible to stack a membrane electrode assembly, a carbon sheet, a hydrogenation catalytic layer, a second carbon sheet, and a separator in this order.

In the fourth embodiment, a gas distribution path that includes the gas diffusion layer 244 and gas flow path 248 and extends to the fuel tank (not shown) corresponds to the "gas flow path" according to the first aspect of the present invention; and the hydrogenation catalytic layer 350 corresponds to the "hydrogenation catalyst" according to the first aspect of the present invention.

Even if the employed fuel cell differs in structure from the fuel cell according to the first to fourth embodiments, the effects and advantages of the present invention can be obtained by disposing the hydrogenation catalyst within the gas distribution path between the fuel tank and the catalytic layer in the fuel cell.

More specifically, the configuration in which the hydrogenation catalyst is positioned within the gas distribution path can be achieved by using a method of disposing the hydrogenation catalyst as part of the gas flow path or a method of coating the inner surface of the gas flow path with the hydrogenation catalyst. Therefore, even if the gas flow path of the employed fuel cell system includes, for instance, conduits, manifolds, separators, or gas diffusion layers that differ in shape from those used in the foregoing embodiments, the configuration for obtaining the effects and advantages of the present invention can be achieved by disposing the hydrogenation catalyst in the gas flow path.

Fifth Embodiment

Figure 8:
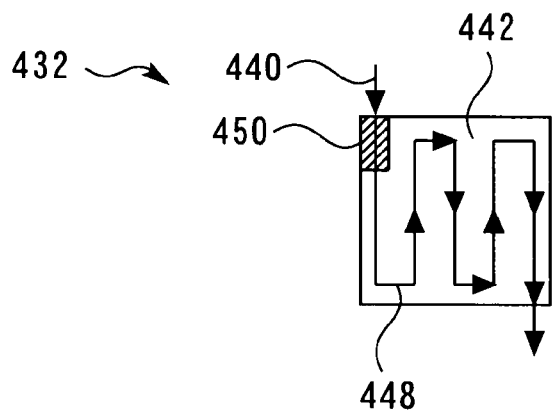
FIG. 8 is a diagram illustrating the configuration of a fuel cell according to the fifth embodiment of the present invention.

FIG. 8 is a diagram illustrating the configuration of a fuel cell 432 according to a fifth embodiment of the present invention. The fuel cell 432 is configured so that a membrane electrode assembly, a gas diffusion layer, and a grooved power collector plate are stacked as is the case with the unit fuel cells according to the first to fourth embodiments described earlier. The following description deals with only the anode-side configuration of the fuel cell 432, which is characteristic of the fifth embodiment.

Further, the fuel cell according to the fifth embodiment is used in the same fuel cell system as that of the third embodiment. More specifically, a fuel cell stack can be formed by stacking a plurality of fuel cell 432 to establish a system that includes, for instance, a fuel tank containing a nonsulfur odorant and hydrogen and a purge valve as is the case with the third embodiment.

FIG. 8 shows an electrode catalytic layer 442 for the anode of a fuel cell 432. In reality, however, an electrolyte membrane (not shown) is disposed on the paper back surface side of the electrode catalytic layer 442 shown in FIG. 8. In addition, a gas diffusion layer (not shown) is positioned on the paper front surface side in FIG. 8 and superimposed over the electrode catalytic layer 442. Further, a separator with a groove, which serves as a gas flow path, is disposed on the paper front surface side of the gas diffusion layer.

For the sake of explanation, FIG. 8 shows a line representing the separator's gas flow path, which is designated by the reference numeral 448. In reality, a groove having predetermined width and depth is formed in the separator and extended along this line. For descriptive purposes, the line designated by the reference numeral 448 will be described as the gas flow path 448. As shown in FIG. 8, the gas flow path 448 according to the fifth embodiment meanders in the plane of the fuel cell 432.

The reference numeral 440 denotes a part of the manifold disposed in the fuel cell according to the fourth embodiment. The manifold 440 is connected to a plurality of unit fuel cells including the fuel cell 432. FIG. 8 shows only a portion that is connected to the unit fuel cells 432. The upstream end of the manifold 440 is connected to the fuel tank (not shown) through a conduit (not shown). When the system generates electrical power, it supplies hydrogen from the fuel tank (not shown) to the gas flow path 448 through the manifold 440. The hydrogen is then distributed in the direction of the arrows on the line representing the gas flow path 448 and supplied toward the electrode catalytic layer.

In the fifth embodiment, a hydrogenation catalytic layer 450 is positioned near the joint between the gas flow path 448 and manifold 440. The fifth embodiment uses the hydrogenation catalytic layer 450 as an odorant hydrogenation mechanism instead of various hydrogenation mechanisms according to the first to fourth embodiments. More specifically, the electrode catalytic layer 442 is formed, as shown in FIG. 8, over the whole surface of the electrolyte membrane (not shown), which is positioned on the paper back surface side, to locally form the hydrogenation catalytic layer 450 at the inlet of the gas flow path 448. When the gas distribution path is viewed along the gas flow path 448, the electrode catalytic layer 442 is positioned downstream of the hydrogenation catalytic layer 450.

The hydrogenation catalytic layer 450 can be formed by employing a NiMo catalyst as a catalyst active site material, using alumina as a support, turning a combination of these substances into paste, and coating the surface of the electrolyte membrane with the paste. This method can be applied in the same manner as a conventional method of preparing an electrode catalytic layer for a fuel cell, that is, a method of preparing the electrode catalytic layer 442 by supporting platinum on carbon.

The hydrogenation catalytic layer 450 is disposed to hydrogenate the odorant for the purpose of preventing the electrode catalytic layer 442 from being poisoned. Therefore, the hydrogenation catalytic layer 450 differs from the electrode catalytic layer 442 in that the former does not need electrical conductivity. Consequently, the present embodiment uses alumina as the support. The hydrogenation catalytic layer 450 also differs from the electrode catalytic layer 442 in that the former is not expected to exhibit high responsiveness during a reaction in which hydrogen atoms are separated into protons and electrons. Thus, the present embodiment uses a NiMo catalyst as the catalyst active site material.

When the system supplies a gas mixture of hydrogen and odorant to the unit fuel cells 432 for power generation purposes, the odorant contained in the gas flowing into the gas flow path 448 is hydrogenated by the hydrogenation catalytic layer 450. This makes it possible to prevent the electrode catalytic layer 442 from being poisoned and let a power generation reaction occur in the electrode catalytic layer 442 in an unobstructed manner.

In the fifth embodiment, the separator (not shown) corresponds to the "gas flow distribution member" according to the sixth aspect of the present invention; the joint between the gas flow path 448 and the manifold 440 corresponds to the "gas inlet" according to the sixth aspect of the present invention; the gas flow path 448 corresponds to the "gas flow path" according to the sixth aspect of the present invention; the hydrogenation catalytic layer 450 corresponds to the "first portion" according to the sixth aspect of the present invention; and the electrode catalytic layer 442 corresponds to the "second portion" according to the sixth aspect of the present invention.

Figure 9:
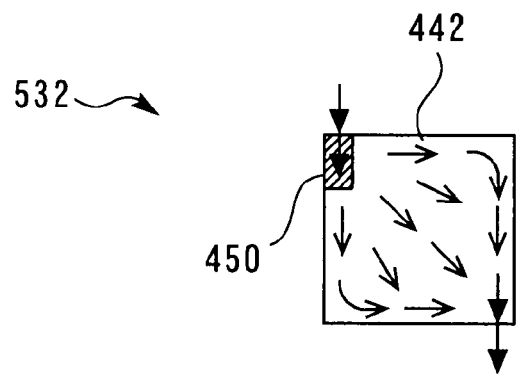
FIG. 9 shows the configuration of a modification of the fifth embodiment.

FIG. 9 shows a modification of the fifth embodiment. A unit fuel cell 532 shown in FIG. 9 differs from the unit fuel cell 432 shown in FIG. 8 in that the former includes a porous layer (not shown), which is made of a conductive material and positioned between a power collector plate and a membrane electrode assembly, and uses the porous layer as a gas flow path. A large number of contiguous pores are formed in the porous layer so that the gas can be distributed through the pores.

When the porous layer is used as the gas flow path, the gas flows radially from the gas inlet as indicated by the arrows in FIG. 9. Even if the employed unit fuel cells include the above-described porous layer, the hydrogenation function of the hydrogenation catalytic layer 450 works to prevent the catalyst from being poisoned by the odorant. A technology for using the porous layer as the gas flow path will not be described in detail because it is publicly known.

As describe earlier, the hydrogenation catalytic layer 450 need not always be electrically conductive. In addition, the hydrogenation catalytic layer 450 need not necessarily be as active in generating protons from hydrogen as the electrode catalytic layer 442. Therefore, it is not always necessary to use platinum or other expensive noble metal as the catalyst active site material. This makes it possible to select the materials for the catalyst and support from a wide variety of options including metal oxides and ceramics, such as titania, alumina, and silica. In other words, the hydrogenation catalyst can be formed by selecting the materials for the catalyst active site and support as needed from various options including low-conductivity or nonconductive materials to satisfy cost, strength, and durability.

It should also be noted that all the ideas presented in the first to fifth embodiments, which have been described above, can be applied to a single system. More specifically, an alternative is to dispose the hydrogenation device 14 and the hydrogenation cell 130 in the middle of the gas distribution path between the fuel tank and fuel cell, and incorporate the hydrogenation catalytic layers 250, 350 (or 450) into the fuel cell. Another alternative is to selectively use one or more of the ideas presented in the first to fifth embodiments.

The invention claimed is:

1. A fuel cell system comprising:
a fuel cell which includes a membrane electrode assembly
 a catalytic layer on both surfaces of an electrolyte membrane;
a gas flow path connected to the catalytic layer;
a fuel tank which is connected to the gas flow path to supply a fuel gas to the catalytic layer through the gas flow path;
a hydrogenation catalyst which is disposed in a gas distribution path that extends from the fuel tank to the catalytic layer through the gas flow path, and the hydrogenation catalyst hydrogenates a nonsulfur odorant; and
means for supplying heat generated by the fuel cell to the hydrogenation catalyst,
wherein the fuel cell is a fuel cell stack, which is formed by stacking a plurality of the membrane electrode assembly with a separator sandwiched in between;
wherein the gas flow path includes a manifold, which extends within the fuel cell stack and connects to the respective catalytic layers of the plurality of the membrane electrode assembly, and a conduit, which is disposed outside the fuel cell stack and connects the manifold to the fuel tank; and
wherein a hydrogenation cell, which contains the hydrogenation catalyst, is integrated into the fuel cell stack, and the hydrogenation cell is positioned between the manifold and the conduit.

2. A fuel cell system comprising:
a fuel cell which includes a membrane electrode assembly
 a catalytic layer on both surfaces of an electrolyte membrane;
a gas flow path connected to the catalytic layer;
a fuel tank which is connected to the gas flow path to supply a fuel gas to the catalytic layer through the gas flow path;
a hydrogenation catalyst which is disposed in a gas distribution path that extends from the fuel tank to the catalytic layer through the gas flow path, and the hydrogenation catalyst hydrogenates a nonsulfur odorant;
means for supplying heat generated by the fuel cell to the hydrogenation catalyst; and
a gas distribution member, which includes a gas diffusion layer and a plate material that is stacked on the gas diffusion layer, is provided with a groove in the surface in contact with the gas diffusion layer, and is superimposed over the catalytic layer so that the gas diffusion layer faces the catalytic layer,
wherein the groove is connected to the gas flow path and positioned between the gas flow path and the catalytic layer;
wherein the hydrogenation catalyst is disposed on the inner surface of the groove; and
wherein the hydrogenation catalyst is disposed between the plate material and the gas diffusion layer to prevent contact between the plate material and the gas diffusion layer.

3. A fuel cell comprising:
a membrane electrode assembly in which a catalytic layer containing a catalyst and a support is disposed on both surfaces of an electrolyte membrane; and
a gas distribution member which is superimposed over the catalytic layer and includes a gas inlet and a gas flow path that is internally extended from the gas inlet and connected to the catalytic layer;

wherein a first portion of the catalytic layer, which is positioned near the gas inlet, differs in catalyst material from a second portion, which is the remaining portion of the catalytic layer; and wherein the catalyst material for the first portion is less active in generating protons from hydrogen atoms than the catalyst material for the second portion and equally or more active in hydrogenating a nonsulfur odorant than the catalyst material for the second portion.

4. The fuel cell according to claim 3, wherein the catalyst for the first portion of the catalytic layer contains either a nickel-molybdenum (NiMo) catalyst or a cobalt-molybdenum (CoMo) catalyst.

5. The fuel cell system according to claim 1, wherein the manifold extends through the fuel cell in a stacking direction and the hydrogenation cell is disposed at an end of the fuel cell.

6. The fuel cell according to claim 3, wherein the gas flow path includes a separator groove having a predetermined width and a predetermined depth, the separator groove extends along a predetermined path through the gas distribution member.

7. The fuel cell according to claim 3, wherein the gas flow path includes a porous layer to radially distribute gas from the gas inlet to the catalytic layer.

* * * * *